(12) United States Patent
Kakishita et al.

(10) Patent No.: US 12,530,911 B2
(45) Date of Patent: Jan. 20, 2026

(54) OBJECT CLASSIFYING APPARATUS, OBJECT CLASSIFICATION SYSTEM, AND OBJECT CLASSIFICATION METHOD

(71) Applicant: HITACHI HIGH-TECH CORPORATION, Tokyo (JP)

(72) Inventors: Yasuki Kakishita, Tokyo (JP); Hideharu Hattori, Tokyo (JP); Taku Sakazume, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 444 days.

(21) Appl. No.: 18/037,278

(22) PCT Filed: Nov. 12, 2021

(86) PCT No.: PCT/JP2021/041775
§ 371 (c)(1),
(2) Date: May 16, 2023

(87) PCT Pub. No.: WO2022/124007
PCT Pub. Date: Jun. 16, 2022

(65) Prior Publication Data
US 2024/0005682 A1    Jan. 4, 2024

(30) Foreign Application Priority Data
Dec. 8, 2020   (JP) .................. 2020-203538

(51) Int. Cl.
*G06K 9/00* (2022.01)
*A61K 35/12* (2015.01)
(Continued)

(52) U.S. Cl.
CPC .......... *G06V 20/698* (2022.01); *G06F 3/0482* (2013.01); *G06T 7/0012* (2013.01);
(Continued)

(58) Field of Classification Search
CPC .......... G06K 9/00; A61K 35/12; G06V 20/69
USPC ....... 382/100, 103, 106, 128–134, 156, 162, 382/168, 173, 181, 199, 219, 224, 254, 382/276, 286–291, 305, 321; 378/43, 62
See application file for complete search history.

(56) References Cited

U.S. PATENT DOCUMENTS 8,346,483 B2    1/2013 Kil
2015/0317509 A1*  11/2015 Kil ........................... G06T 7/11
                                                   382/133

(Continued)

FOREIGN PATENT DOCUMENTS

JP         2011-229409 A     11/2011

OTHER PUBLICATIONS

International Search Report and English Translation, PCT/JP2021/041775, Jan. 25, 2022 (5 pgs.).

(Continued)

*Primary Examiner* — Seyed H Azarian
(74) *Attorney, Agent, or Firm* — Volpe Koenig

(57) ABSTRACT

Representative features which are representative features for deciding the types or states of objects are extracted, the types or states of the objects are identified on the basis of the representative features to classify the objects, and the object classification results and the representative features are output in association with an image.

13 Claims, 20 Drawing Sheets

(51) Int. Cl.
   *G06F 3/0482*    (2013.01)
   *G06T 7/00*      (2017.01)
   *G06T 7/62*      (2017.01)
   *G06V 10/44*     (2022.01)
   *G06V 10/75*     (2022.01)
   *G06V 10/764*    (2022.01)
   *G06V 10/771*    (2022.01)
   *G06V 20/69*     (2022.01)

(52) U.S. Cl.
   CPC ............... *G06T 7/62* (2017.01); *G06V 10/44* (2022.01); *G06V 10/758* (2022.01); *G06V 10/764* (2022.01); *G06V 10/771* (2022.01); *G06T 2207/30024* (2013.01)

(56) References Cited

U.S. PATENT DOCUMENTS

| | | | |
|---|---|---|---|
| 2017/0178321 A1* | 6/2017 | Nieves Alicea | G06F 18/24 |
| 2018/0053296 A1* | 2/2018 | Hattori | G06T 7/0012 |
| 2019/0172206 A1* | 6/2019 | Kakishita | G06V 20/698 |
| 2019/0301999 A1* | 10/2019 | Berezhna | G02B 21/34 |
| 2020/0098105 A1* | 3/2020 | Nieves Alicea | G06V 20/695 |
| 2020/0125894 A1 | 4/2020 | Maeda et al. | |
| 2022/0359077 A1* | 11/2022 | Chorev | G06T 7/11 |

OTHER PUBLICATIONS

Chinese Office Action issued on May 10, 2025 for Chinese Patent Application No. 202180080950.8.
European Office Action issued on Sep. 23, 2024 for European Patent Application No. 21903111.9.

* cited by examiner

FIG. 9

| REPRESENTATIVE FEATURE | | ASSESSMENT RESULT |
| --- | --- | --- |
| MEMBRANE | CYTOPLASM | |
| THIN | SMALL AMOUNT | UNDIFFERENTIATED |
| THICK | LARGE AMOUNT | DIFFERENTIATED |

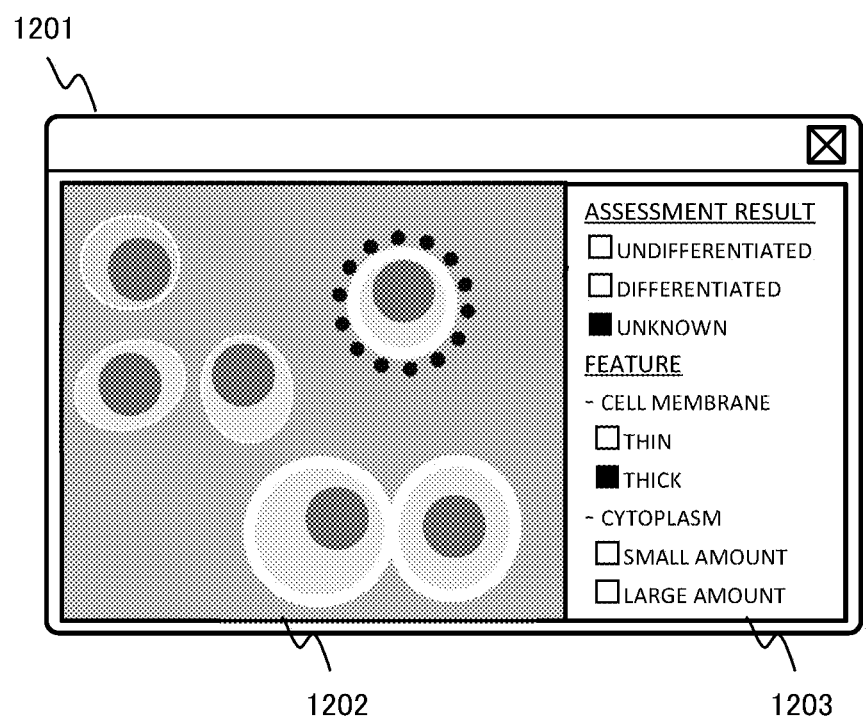
F I G . 1 2 A

FIG.17

| REPRESENTATIVE FEATURE || ASSESSMENT RESULT |
|---|---|---|
| SIZE | SHAPE | |
| LARGE | CIRCLE | HIGH |
| SMALL | CIRCLE | MEDIUM |
| SMALL | RECTANGLE | LOW |

OBJECT CLASSIFYING APPARATUS, OBJECT CLASSIFICATION SYSTEM, AND OBJECT CLASSIFICATION METHOD

TECHNICAL FIELD

The present invention relates to an object classifying apparatus, an object classification system, and an object classification method.

BACKGROUND ART

In a case where observation of cells or materials is performed, typically, an optical microscope, an electron microscope, or the like is used. However, observation of microscopic images by the naked eyes is very time-consuming, and requires expertise in many cases. In view of this, in order to assist evaluation of cells or materials using a microscopic image, technologies for automating a partial process by using image processing have been developed.

For example, Patent Document 1 discloses a technique for assessing the state of cells by using temporal changes in morphological characteristics of two different types of cells. However, in many cases, the surfaces of cells or materials are unstructured, and precise assessment based simply on manually designed features is not possible, in some cases.

On the other hand, in recent years, there have been reported examples of precision enhancement of microscopic image analysis over conventional technologies by using machine learning including deep learning among others. In a case of deep learning, a machine automatically learns features, and accordingly allows acquisition of features that are difficult to design manually, in some cases.

PRIOR ART DOCUMENT

Patent Document

Patent Document 1: JP-2011-229409-A

SUMMARY OF THE INVENTION

Problem to be Solved by the Invention

It may be possible to automatically learn features that are more effective for enhancement of classification precision by creating an object classifier by using deep learning, than by manually designing features.

However, in a case of a typical classifier using deep learning, output that a user can obtain is only classification results. For example, even if there are features that seem effective for classification in a particular site in an object when a microscopic image is observed by human eyes, there are no proofs that features have been learned and extracted correctly from that site. Because of this, it is difficult to classify objects in an image precisely.

An object of the present invention is to classify objects in an image precisely in an object classifying apparatus.

Means for Solving the Problem

An object classifying apparatus according to an aspect of the present invention is an object classifying apparatus that classifies objects in images, and identifies a type or a state of the object, the object classifying apparatus including: an object area computing section that computes object areas of the objects in the images; a feature selecting section that selects a feature of the object by using the object area, and outputs a feature selection signal; a feature extracting section that extracts a plurality of the features from within the image on a basis of the feature selection signal; a feature classifying section that classifies a plurality of the features, and extracts representative features which are representative features for deciding the type or the state of the object; an object classifying section that identifies the type or the state of the object and classifies the object on a basis of the representative features, and outputs a classification result of the object; and an output section that outputs the classification result and the representative features of the object in association with the image.

Advantages of the Invention

The aspect of the present invention can enable precise classification of objects in images in the object classifying apparatus.

BRIEF DESCRIPTION OF THE DRAWINGS

FIG. 9 is a figure depicting an example of correspondence table of features and object classes.

FIG. 12A is a figure depicting an example of GUI according to the second embodiment.

FIG. 17 is a figure depicting an example of correspondence table of features and object classes.

MODES FOR CARRYING OUT THE INVENTION

Figure 1:
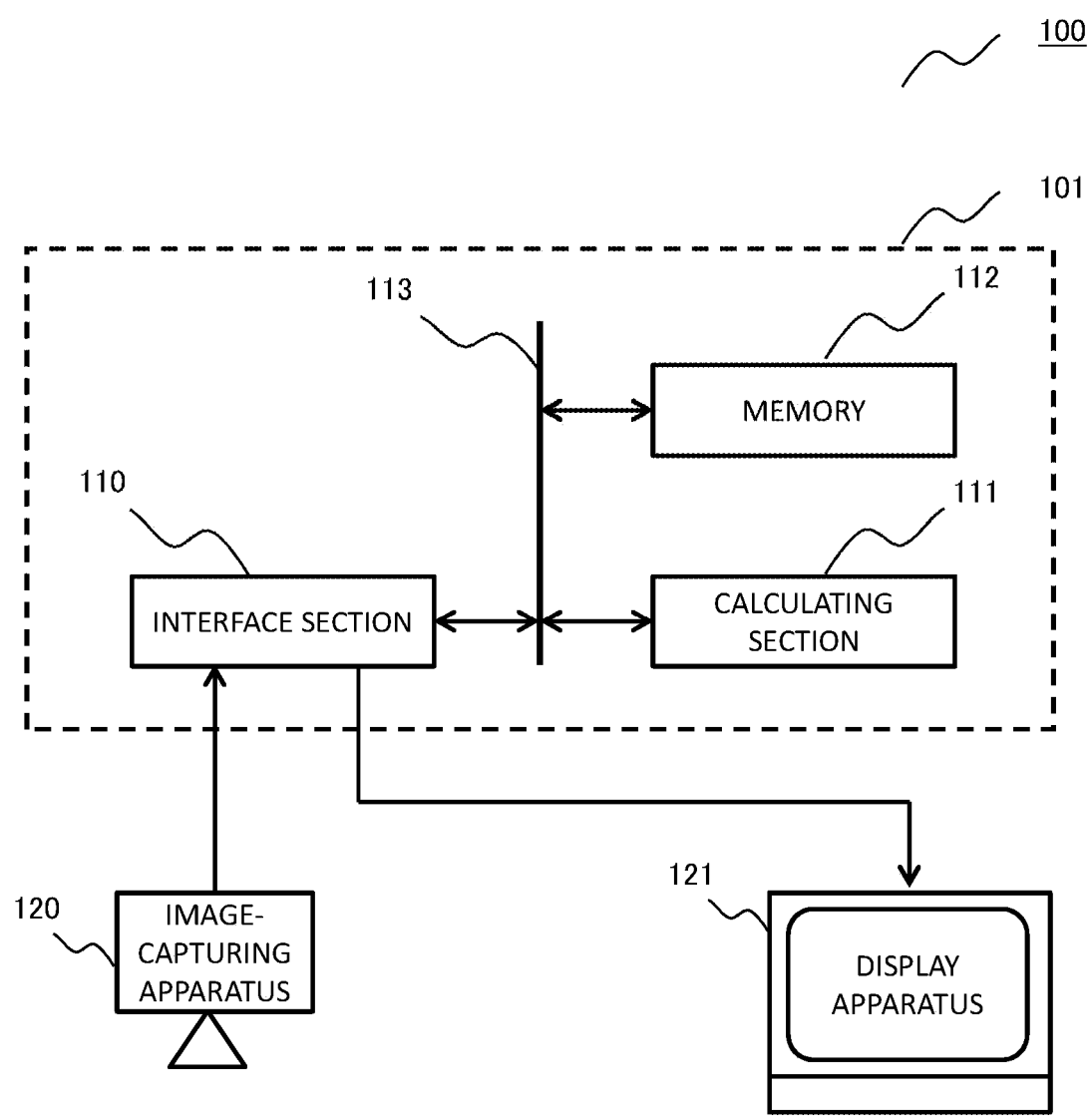
FIG. 1 is a figure depicting an example of hardware configuration of an object classification system according to a first embodiment.

Hereinbelow, embodiments of an object classifying apparatus, method, and system according to the present invention are explained according to attached figures. Note that in the following explanation and attached figures, overlapping explanations of constituent elements that are configured functionally identically are omitted by giving them identical reference characters.

First Embodiment

An example of object classification system that classifies objects in an image according to a first embodiment is explained by using FIG. 1.

An object classification system 100 includes an object classifying apparatus 101, an interface section 110, a calculating section 111, a memory 112, and a bus 113, and the interface section 110, the calculating section 111, and the memory 112 transmit and receive information via the bus 113. In addition, the object classifying apparatus 101 is connected to an image-capturing apparatus 120 and a display apparatus 121 via the interface section 110.

Each section of the object classifying apparatus 101 is explained.

The interface section 110 is a communication apparatus that transmits and receives signals to and from apparatuses located outside the object classifying apparatus 101. The apparatuses that communicate with the interface section 110 include the image-capturing apparatus 120 and the display apparatus 121. Details of the image-capturing apparatus 120 and the display apparatus 121 are mentioned later.

The calculating section 111 is an apparatus that executes various types of process in the object classifying apparatus 101, and includes a CPU (Central Processing Unit), an FPGA (Field-Programmable Gate Array), or the like. Functionalities executed by the calculating section 111 are mentioned later by using FIG. 2.

The memory 112 is an apparatus that stores thereon programs to be executed by the calculating section 111, parameters, coefficients, processing results, and the like, and includes an HDD, an SSD, a RAM, a ROM, a flash memory, or the like.

The image-capturing apparatus 120 is an apparatus that captures images of objects, and includes a camera, a microscope, or the like. The image-capturing apparatus 120 transmits the captured images to the object classifying apparatus 101.

The display apparatus 121 is an apparatus for displaying object classification information output by the object classifying apparatus 101, and includes a display, a printer, or the like.

Hereinafter, the object classifying apparatus 101 is explained in detail.

Figure 2:
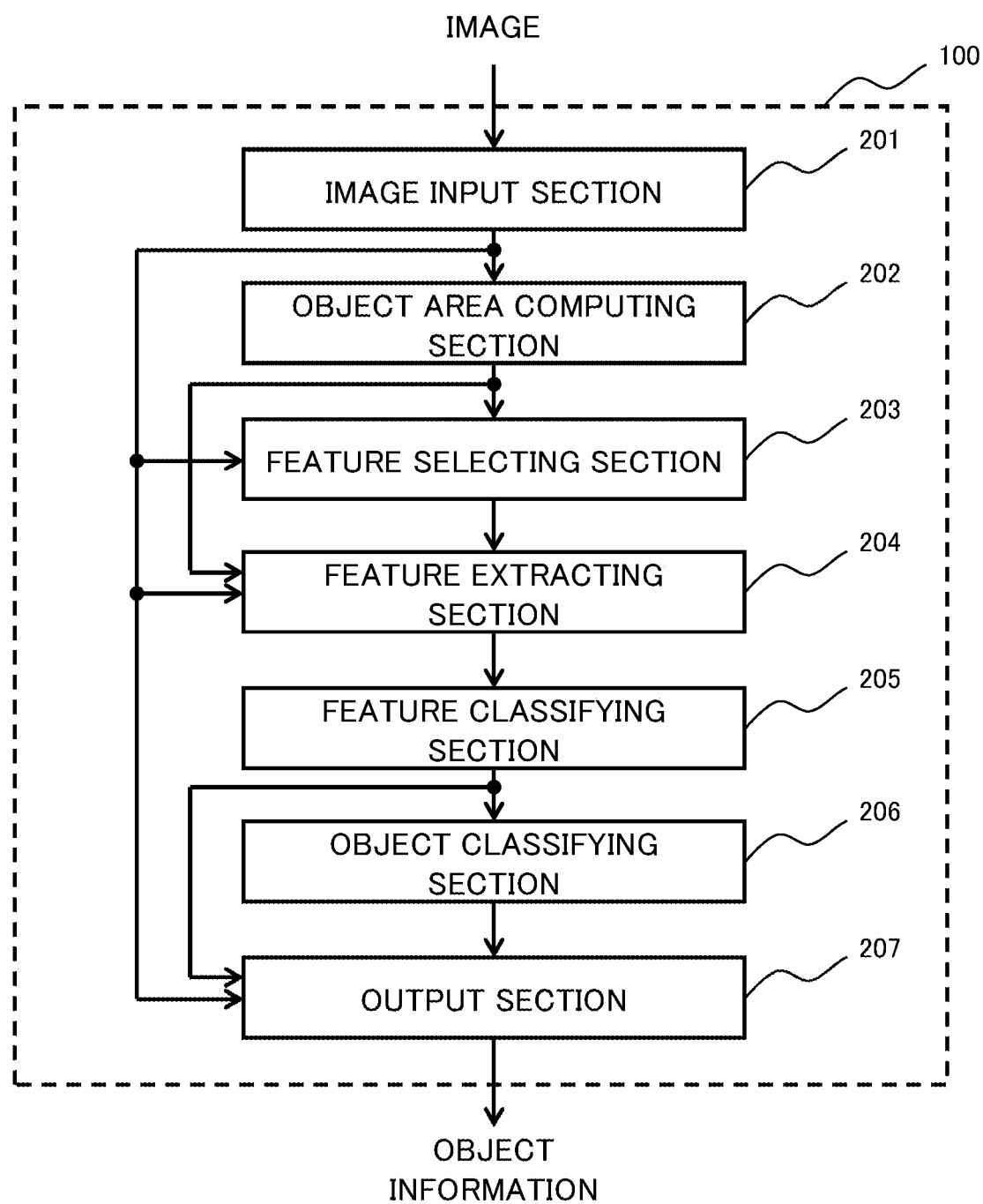
FIG. 2 is a figure depicting an example of functional block diagram of an object classifying apparatus according to the first embodiment.

FIG. 2 is an example of functional block diagram of the object classifying apparatus 101 according to the first embodiment. Note that these functionalities may be configured by using dedicated hardware or may be configured by using software operating on the calculating section 111.

The object classifying apparatus 101 includes an image input section 201, an object area computing section 202, a feature selecting section 203, a feature extracting section 204, a feature classifying section 205, an object classifying section 206, and an output section 207. Hereinbelow, each section is explained.

The image input section 201 accepts a captured image of objects input through the interface section 110. The input image is input to the object area computing section 202, the feature extracting section 204, and the output section 207 via the memory 112.

The object area computing section 202 is explained.

The object area computing section 202 extracts object areas which are to be treated as classification subjects by using the input image accepted by the image input section 201. As an example of object area extraction method, a method to be performed in a case where an area segmenting device is used is explained. Area segmentation is one of image processing techniques, and is a technique for segmenting an image into semantic sets in units of pixels. For example, pixels are binarily classified into pixels as the foreground where there is a classification subject object, and pixels of the background which are the other remaining pixels, and a combined area of areas classified as the foreground is sensed to thereby sense an area for each object.

Figure 3:
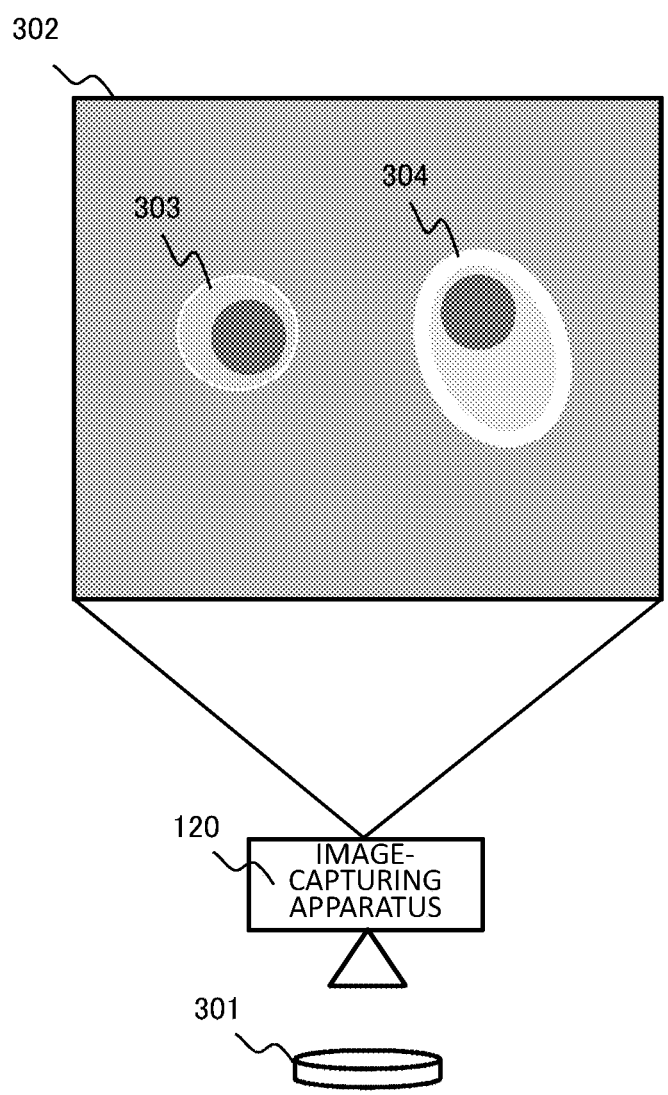
FIG. 3 is a figure depicting an example of microscopic image obtained by capturing an image of ES cells.

FIG. 3 depicts an example of microscopic image of ES cells.

It is supposed that there is a group of ES cells on a petri dish 301. An image of a cell group obtained by image-capturing by the image-capturing apparatus 120 from above the petri dish is a microscopic image 302. A cell 303 and a cell 304 are captured in the microscopic image 302. ES cells have pluripotency by which the ES cells can differentiate into various tissues. However, if an ES cell has differentiated once, pluripotency is lost, and accordingly it is necessary to check whether or not an ES cell has differentiated. Then, in a case where the ES cell has differentiated, the cytoplasm tends to increase, and the cell membrane tends to be thicker. Accordingly, a method to be explained uses these features to assess differentiation of ES cells.

Figure 4:
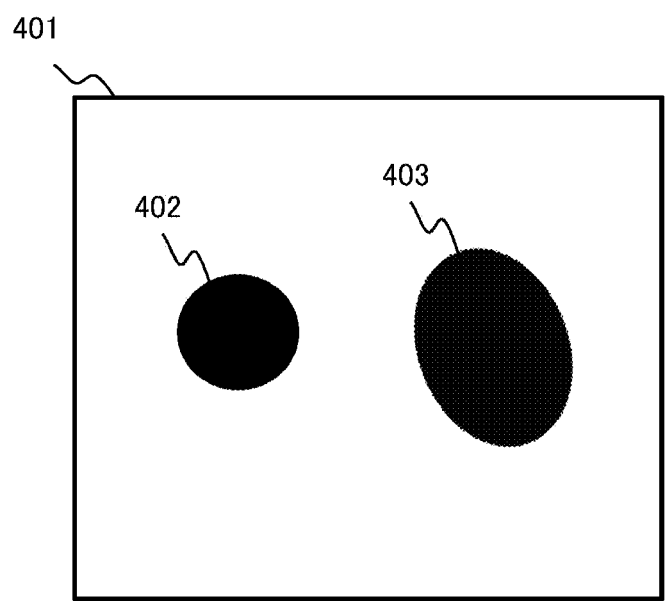
FIG. 4 is a figure depicting an example of area segmentation application result.

FIG. 4 depicts an example of result of application of area segmentation to the microscopic image 302.

In an area segmentation result 401, the areas of cells are drawn in black as foreground areas (object areas), and the other areas are drawn in white as the background area. Object areas corresponding to the cell 303 and the cell 304 in the microscopic image 302 are an object area 402 and an object area 403, respectively.

In this manner, the object area computing section 202 computes and outputs area information about classification or assessment subject objects. In the example depicted in FIG. 3, area information about cells is computed as object area information in order to perform cell differentiation assessment.

Figure 16:
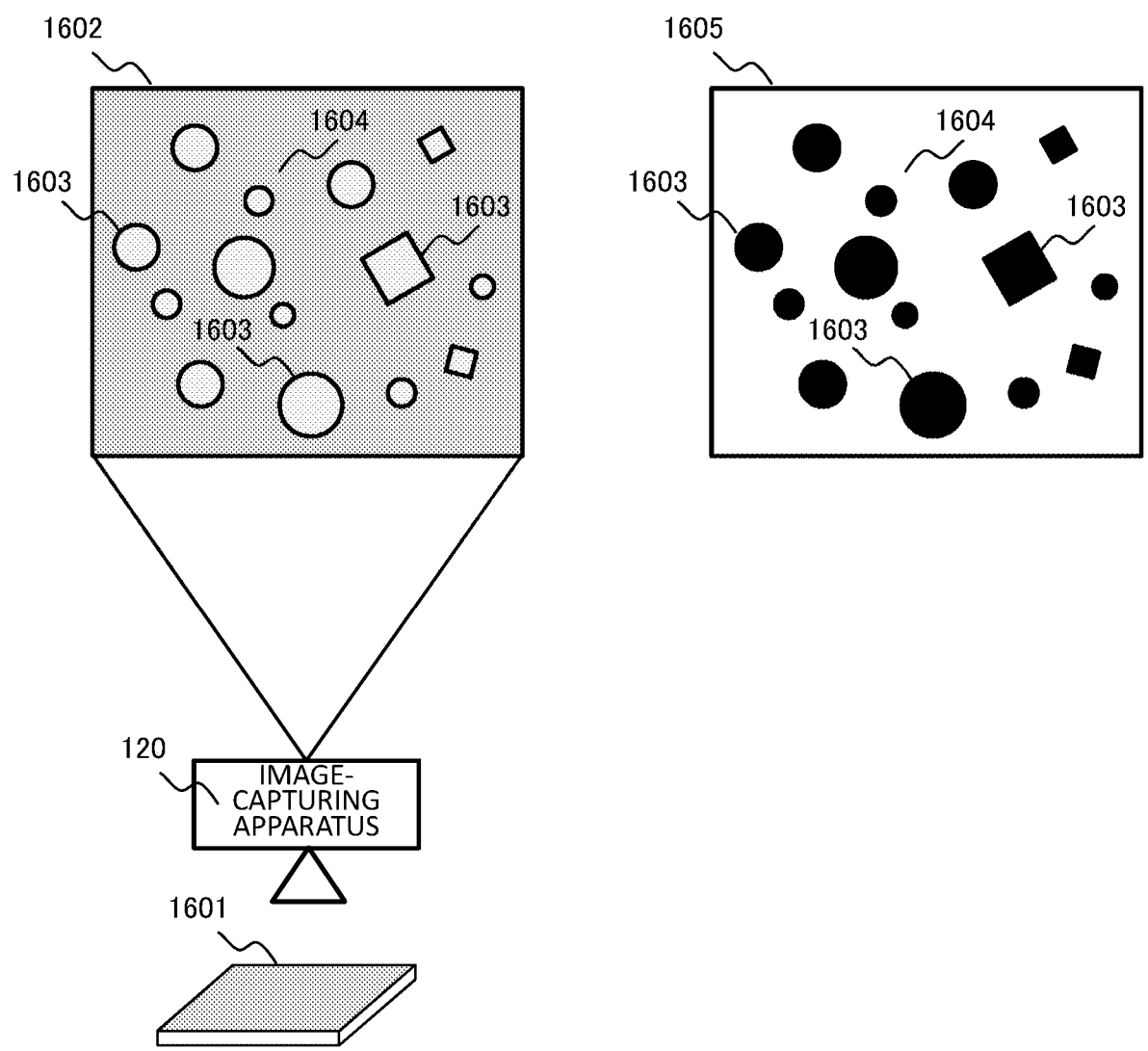
FIG. 16 is a figure depicting an example of microscopic image obtained by capturing an image of the surface of a material.

Next, FIG. 16 depicts an example of material quality assessment. The quality of a material 1601 is assessed by observing the state of the surface of the material 1601 in an example to be explained.

In the example depicted in FIG. 16, the quality is assessed as good in a case where the texture of the surface of the material 1601 includes circular and large elements. A microscopic image 1602 is a captured image of the material 1601 obtained by image-capturing by the image-capturing apparatus 120. The microscopic image 1602 includes a background 1604 of the surface of the material 1601, and elements 1603 configuring the texture. In order to simplify the figure, not all the elements 1603 in the microscopic image 1602 are given symbols, but areas in the microscopic image 1602 other than the background 1604 correspond to the elements 1603. An area segmentation result 1605 is an example of area segmentation result of the microscopic image 1602. Subject objects in the example depicted in FIG. 16 are the elements 1603. The areas of the elements 1603 are drawn in black, and the area of the background 1604 is drawn in white.

Whereas the description above illustrates binary classification into foreground and background, the object area computation method is not limited to this. For example, in a case where the cells contact each other in the microscopic image in the example of ES cells mentioned above, object areas also may contact each other if the area segmentation technique described above is used. The contacting object areas are determined as one cell by the functional sections mentioned later, and become a factor that inhibits accurate feature extraction or classification.

In view of this, in order to extract individual object areas separately, instead of binary classification into foreground and background at a time of area segmentation, a distance image on which the shortest distance from each foreground pixel to a background pixel is represented as a luminance value may be estimated. On the distance image, the luminance of a portion near the center of an object is high, and the luminance lowers as the distance to the background decreases. In view of this, the contacting-object separation precision is enhanced by applying thresholding to the estimated distance image.

Figure 5:
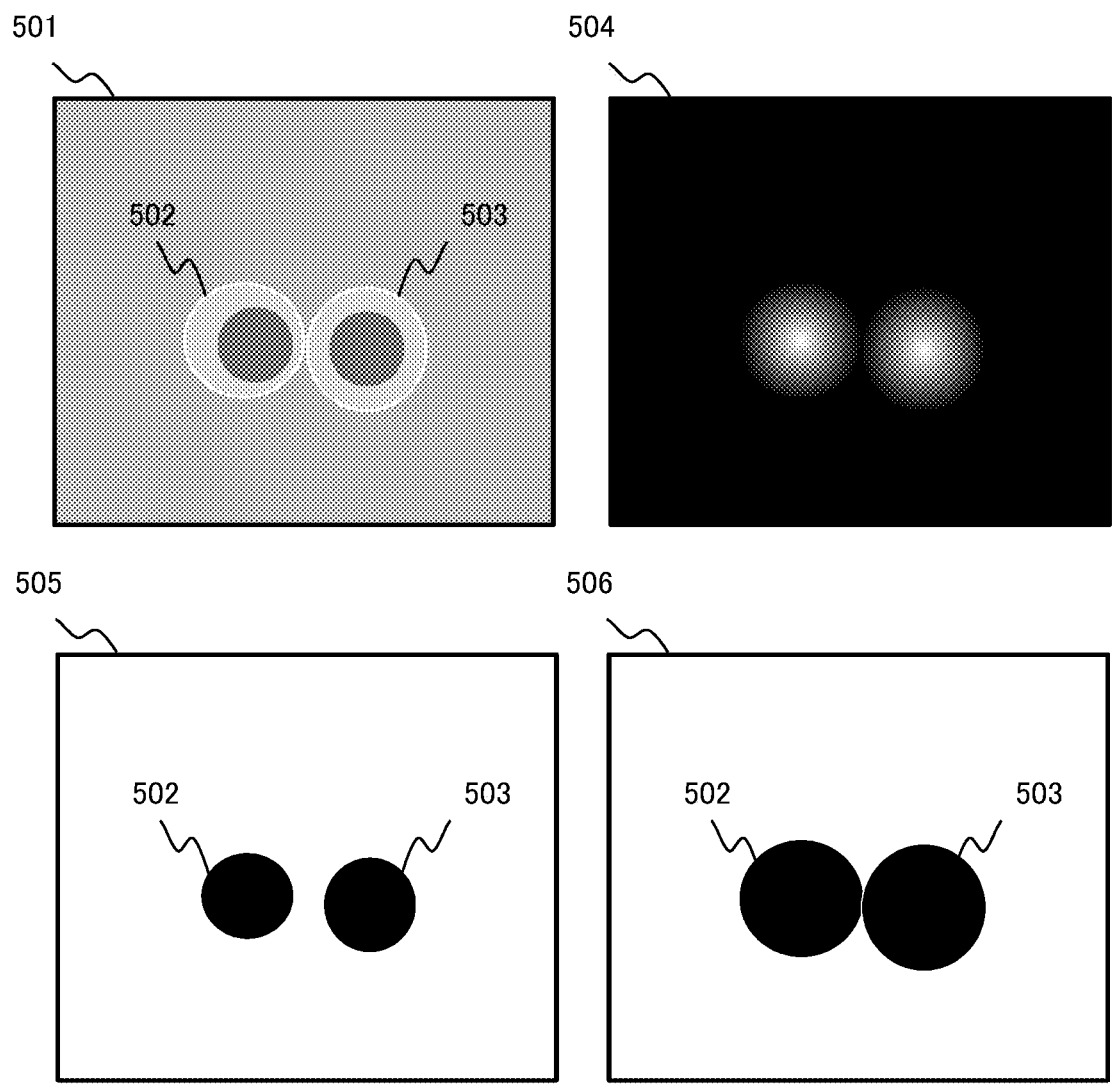
FIG. 5 is a figure depicting an example of contacting-object separation by distance image estimation.

FIG. 5 depicts an example of contacting-object separation by distance image estimation.

A cell 502 and a cell 503 mutually contacting are captured in a microscopic image 501. As mentioned above, in a case where conventional binary area segmentation is performed, it is likely that the object areas of the cell 502 and the cell 503 are combined undesirably. A distance image 504 is an example of result of application of distance image estimation to the microscopic image 501. It can be known that as the distance to the center of a cell decreases, the luminance rises.

A post-thresholding image 505 is a result of thresholding on the distance image 504 in which areas with luminance values lower than a threshold are replaced with white, and areas with luminance values equal to or higher than the threshold are replaced with black. It can be known that the object areas of the cell 502 and the cell 503 are separated. It should be noted that, in the post-thresholding image 505, the object areas of the cell 502 and the cell 503 are estimated as slightly smaller than the actual cells. In view of this, processes such as the Water shed method or the Graph cut method may be used to interpolate the object areas.

An interpolated image 506 is a result of interpolation by the Water shed method by using the post-thresholding image 505 and the distance image 504. As represented by the interpolated image 506, it is possible to obtain the overall shapes of the object areas while, at the same time, separation of the object areas is achieved.

By the process described above, the object area computing section 202 extracts object areas, which are to be treated as classification subjects, from the input image accepted by the image input section 201.

Next, the feature selecting section 203 is explained.

The feature selecting section 203 generates feature selection signals on the basis of the object area information output by the object area computing section 202, and the input image accepted by the image input section, and outputs the feature selection signals to the feature extracting section 204. A feature selection signal includes the type and size of a feature to be extracted, and area information about an area from which the feature is to be extracted.

Figure 6:
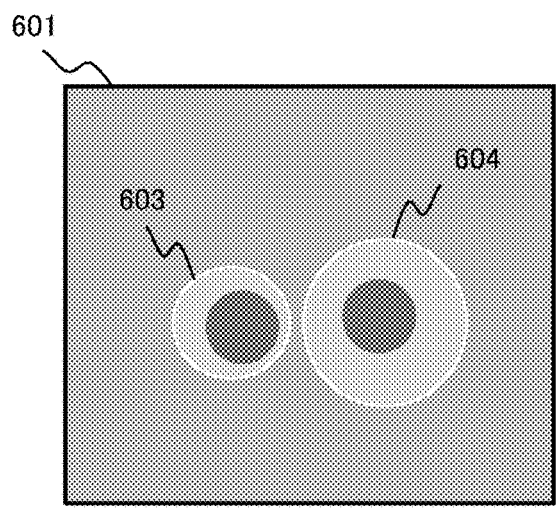
FIG. 6 is a figure depicting an example of feature extraction of cell nucleuses.
Figure 6:
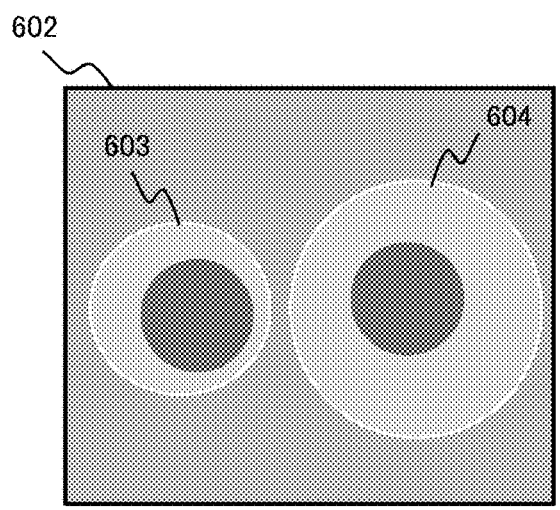
Figure 6:
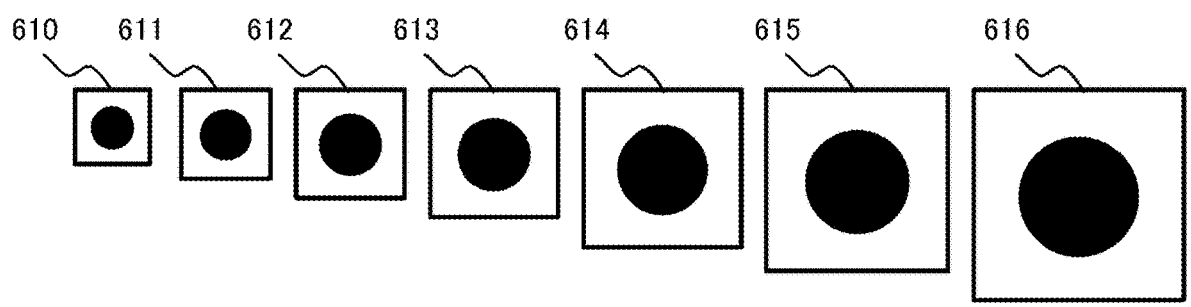

An explanation is given by using the example of ES-cell differentiation assessment mentioned before. As mentioned in the explanation about the object area computing section 202, cytoplasm amounts and cell-membrane thicknesses are important features in ES-cell differentiation assessment. As one method for evaluating the cytoplasm amount, a method of assessing the cell-nucleus size relative to a cell area is explained. FIG. 6 depicts an example in which cell-nucleus sizes are extracted as features. A microscopic image 601 and a microscopic image 602 are images that capture identical subjects.

It should be noted that the microscopic image 602 is one that is obtained by image-capturing with a higher magnification than that for the microscopic image 601. Image-capturing subjects are a cell 603 and a cell 604, and the cytoplasm amount of the cell 603 is small, and the cytoplasm amount of the cell 604 is large. A filter 610, a filter 611, a filter 612, a filter 613, a filter 614, a filter 615, and a filter 616 are filters for extracting features of the cell nucleuses. A black circle at the center of each filter represents a cell nucleus, the filter 610 has the smallest cell nucleus, and the cell-nucleus sizes increase toward the filter 616.

It is supposed that the highest score is obtained in a case where a filter whose cell-nucleus size is closest to the size of the nucleus of a cell in the microscopic image is applied. In the example depicted in FIG. 6, the filter that most fits the cell nucleuses of the cell 603 and the cell 604 in the microscopic image 601 is the filter 613, and the filter that most fits the cell nucleuses of the cell 603 and the cell 604 in the microscopic image 602 is the filter 616.

Here, for example, the cell 604 in the microscopic image 601 and the cell 603 in the microscopic image 602 have almost the same overall cell sizes. However, the ratio of the cell nucleus of the cell 603 in the microscopic image 602 to the cell 603 is higher, and accordingly it can be said that the cell 603 has a smaller cytoplasm amount, and the cell 604 has a larger cytoplasm amount.

In order to make this assessment automatically, it is necessary to select a cell-nucleus feature extraction filter according to the overall cell size. For example, in a case of the cell 604 in the microscopic image 601, the filter 613 to the filter 616 are selected, and the feature selecting section 203 automatically selects filters such that the cell nucleus is assessed as small (i.e. the cytoplasm amount is assessed as large) if the filter 613 is used, and the assessment-result size of cell nucleus increases (i.e. the assessment-result cytoplasm amount decreases) toward the filter 616.

Similarly, for example, if the size of a cell area is approximately the size of the cell 603 in the microscopic image 601, the filter 610 to the filter 613 are selected, and the feature selecting section 203 automatically selects filters such that the cell nucleus is assessed as small (i.e. the cytoplasm amount is assessed as large) if the filter 610 is used, and the assessment-result size of cell nucleus increases (i.e. the assessment-result cytoplasm amount decreases) toward the filter 613.

As a filter automatic selection method, for example, there is a method in which a plurality of thresholds are set in advance for the area sizes of cell areas. In a case of the example depicted in FIG. 6, first to fourth thresholds are set in advance. Note that the first threshold is the smallest, and the values increase toward the fourth threshold.

First, the area size of each cell is computed from cell areas output by the object area computing section 202. Filters are selected automatically by selecting: the filter 610 to the filter 613 in a case where the area size of a cell is smaller than the first threshold; the filter 611 to the filter 614 in a case where the area size of a cell is equal to or greater than the first threshold, and smaller than the second threshold; the filter 612 to the filter 615 in a case where the area size of a cell is equal to or greater than the second threshold, and smaller than the third threshold; and the filter 613 to the filter 616 in a case where the area size of a cell is equal to or greater than the third threshold.

Note that the method mentioned before is not the sole example, and it is sufficient if a technique in which some features in a plurality of features are selected on the basis of information obtained from object areas output by the object area computing section 202 is used.

In this manner, the feature selecting section 203 automatically selects the sizes of features on the basis of the sizes of object areas. Information about the sizes of the features is output as parts of feature selection signals.

In addition, the feature selecting section 203 selects which feature is to be extracted from which area. For example, when a feature related to cell-membrane thickness is extracted by using filters, the feature of the cell membrane may not be obtained correctly if the filters are applied to areas other than the cell membrane in the cell.

In view of this, the feature selecting section 203 extracts a cell-membrane-periphery area on the basis of the object area information computed by the object area computing section 202, and outputs a feature selection signal such that filters for extracting the feature of the cell membrane are applied only to the cell-membrane-periphery area.

Figure 7:
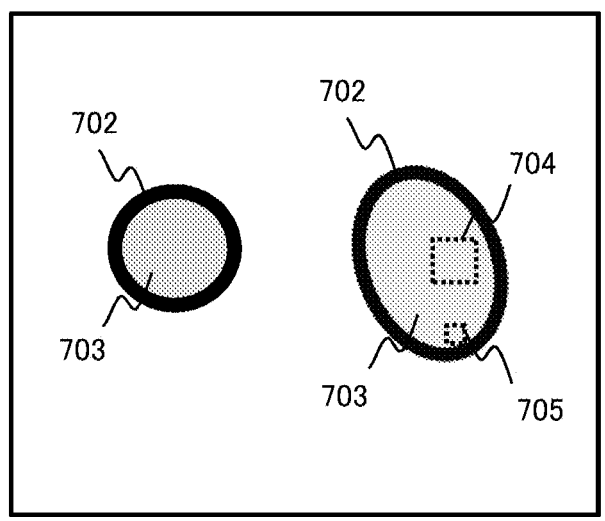
FIG. 7 is a figure depicting an example of cell membrane areas and cytoplasmic areas.

As an example of cell-membrane-periphery-area extraction method, a method that uses an edge extraction technique is explained. FIG. 7 depicts an example of result of extraction of cell membrane areas and cytoplasmic areas from object areas.

Each cell membrane area 702 is a result of computation of the area of a cell membrane by extracting edges in the area segmentation result 401 in FIG. 4. In addition, each cytoplasmic area 703 is the area of cytoplasm determined by subtracting a cell membrane area 702 from the entire object area. An area of interest 704 and an area of interest 705 are examples of areas from which cytoplasm features are to be extracted. As examples of edge extraction methods, there are the Sobel filter, the Laplacian filter, and the like. The feature selecting section 203 outputs, as feature selection signals, the cell membrane areas 702 as areas from which cell-membrane-related features are to be extracted.

In addition, the feature selecting section 203 may select the sizes or types of filters depending on positions on the basis of local information about object areas. For example, when a cytoplasm feature is to be extracted by using filters on a cytoplasmic area 703, it is desirable if the area of the cell membrane is not included in the filters in order to extract the cytoplasm feature accurately. In view of this, a filter with a large size may be selected for a location far from the cell membrane as represented by the area of interest 704, and a filter with a small size may be selected for a location close to the cell membrane as represented by the area of interest 705.

Next, an example of operation of the feature selecting section 203 in the example of material quality assessment mentioned before is explained.

In the material quality assessment, the shape and size of each element configuring the texture are selected as features. A method of shape/size-related feature extraction is mentioned later. In addition, the area segmentation result 1605 depicted in FIG. 16 is output as feature extraction areas.

As described above, the feature selecting section 203 outputs feature selection signals including the types and sizes of features to be extracted, and area information about areas from which the features are to be extracted. The number of the feature selection signals to be output is equal to the number of categories of the features to be extracted. For example, in the example of ES-cell differentiation assessment mentioned above, feature categories are cell membrane and cytoplasm.

Therefore, feature selection signals related to cell membrane and cytoplasm are output. In the example of material quality assessment, feature categories include the circularity and size of each element configuring the texture of the material surface. Therefore, feature selection signals related to circularity and size are output.

An image calibration or transformation process may be combined with the feature extraction area computation method described above. For example, in the example of cell membrane areas described above, expansion or smoothing may be used to expand the edge areas, and thresholding or the like may be used in combination in order to perform binary assessment. In addition, the distance image mentioned before may be used to specify boundary portions, the central portion of an object, the intermediate portion of the object, or the like.

In addition, feature extraction areas may be selected on the basis of luminance values or RGB values of an input image in object areas. For example, in a case where tissues or cells are dyed, they are colored in particular colors depending on sites (cell nucleuses, cell membranes, etc.) or properties (whether or not there is an antigen, etc.). In view of this, feature extraction areas may be extracted by setting a certain range about RGB values or hues.

The feature extracting section 204 is explained.

The feature extracting section 204 extracts features for object classification from selected areas in the input image or the object area information by using selected features, on the basis of the feature selection signals output by the feature selecting section 203.

For example, in the example of ES-cell differentiation assessment mentioned before, the feature extracting section 204 extracts features from areas specified by the feature selecting section 203, by using feature filters (e.g., the filter 613, the filter 614, the filter 615, and the filter 616) for evaluating cytoplasm selected by the feature selecting section 203. Note that object areas computed by the object area computing section 202 are used as cytoplasm feature extraction areas. Feature extraction filters may be created by using machine learning such as Deep Learning, or may be designed manually.

In addition, the feature extracting section 204 may extract features from the object area information output by the object area computing section 202 on the basis of the selection by the feature selecting section 203. For example, in the example of material quality assessment mentioned before, circularities or sizes are extracted from the object area information. As a circularity computation method, for example, there is one that uses a circularity index represented by (Formula 1).

[Formula 1]

$$IC = 4\pi S/L^2 \qquad \text{Formula 1}$$

L represents the circumference of an object area, and S represents the area size of the object area. The index Ic gets closer to 1 as the circularity of the object area increases. In addition, as mentioned later in detail, other than circularity, a rectangularity index or the like represented by (Formula 2) may be used in combination with the circularity index, to assess the shape of an object.

[Formula 2]

$$Is = S/(WH) \quad \text{Formula 2}$$

W and H represent the width and height of the smallest rectangle including an entire object area, and S represents the area size of the object area as with that in (Formula 1). In addition, the area size of the object area is used as the size. Other than these, the length, width, aspect ratio, and the like of an object area may be extracted as features from the object area information.

The feature classifying section 205 is explained.

The feature classifying section 205 computes representative features of each object on the basis of the object area information computed by the object area computing section 202, the feature selection signals computed by the feature selecting section 203, and the feature extraction results output by the feature extracting section 204.

As an example, the example of ES cell state assessment mentioned before is explained by using FIG. 8. A microscopic image 801 is a microscopic image obtained by capturing an image of an ES cell 804. It is supposed that most of the membrane of the ES cell 804 is a thick membrane 805, but a part of it is a thin membrane 806. A feature extraction area 802 is a visualized view of a feature extraction area output by the feature selecting section 203, and a feature extraction result 803 is a visualized view of a feature extraction result. A feature 807 represents that the thick membrane 805 is sensed by the feature extracting section 204, and a feature 808 represents that the thin membrane 806 is sensed by the feature extracting section 204.

Figure 8:
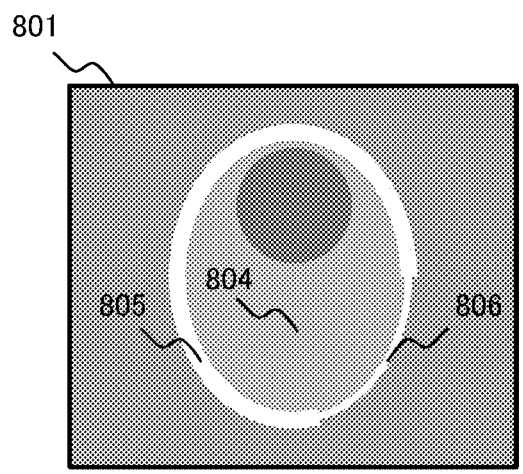
FIG. 8 is a figure depicting an example of representative feature computation of an object.
Figure 8:
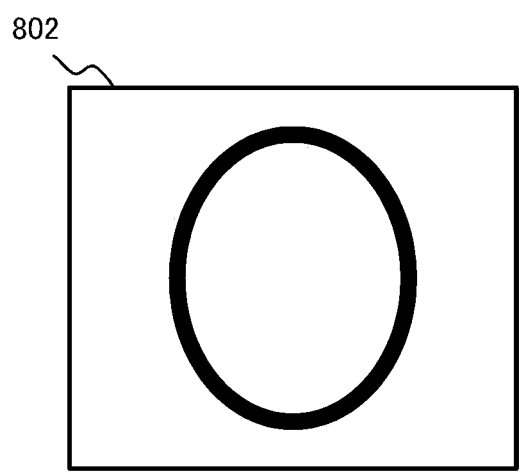
Figure 8:
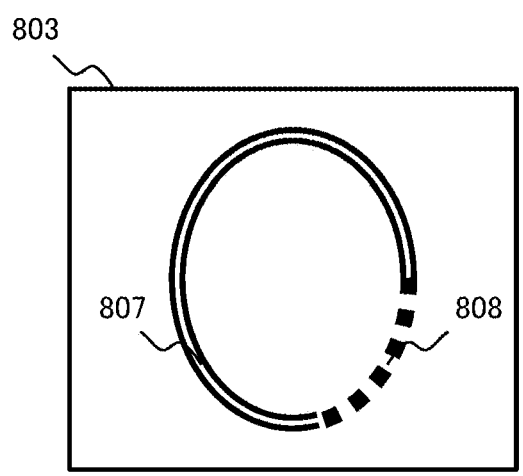

It is not always the case that uniform features are always sensed in one object in an actual microscopic image as with the case in FIG. 8, and partially different features are obtained in some cases. However, it is necessary to obtain comprehensive features of the cell membrane for the purpose of object classification mentioned later. These comprehensive features are called representative features.

As the representative feature decision method, for example, there is a method in which a ratio or score representing how much each feature is sensed in the feature extraction area 802 is accumulated, and a feature with the greatest number of sensed pixels or with the highest score is output as a representative feature. For example, in the example depicted in FIG. 8, the feature 807 (thick membrane) with the highest ratio is chosen as a representative feature.

One or more representative features are chosen for each feature category selected by the feature selecting section 203. Whereas one representative feature is chosen in the description above, thresholds may be set in advance for scores or ratios, and all features whose scores or ratios exceed the thresholds may be treated as representative features.

In addition, any of consecutive values representing the intensity or plausibility of a feature may be added to and output together with a representative feature. For example, explaining in terms of the example depicted in FIG. 8, the consecutive values include the ratio of the feature 807 to the feature extraction area, the sum total of feature scores, and the like.

In addition, representative features may be decided on the basis of a plurality of indexes obtained from an entire feature extraction area. For example, in an example method to be explained, the feature classifying section 205 extracts a representative feature related to the shape of an object in the example of material quality assessment mentioned before.

In the example of material quality assessment, the feature extracting section 204 extracts circularity and rectangularity as features from an entire object area. The feature classifying section 205 classifies an object as a circle if its circularity is higher than its rectangularity and otherwise classifies the object as a rectangle, and outputs the circularity or rectangularity as a representative feature. In addition, depending on the value of the circularity or rectangularity, a class, such as circle (high circularity) or circle (low circularity), may be determined about the object. In addition, for example, regarding the sizes of objects, a threshold 1 and a threshold 2 about area sizes are set in advance. An object area is classified as having a small size if the size of the object area is smaller than the threshold 1, is classified as having a medium size if the size of the object area is equal to or greater than the threshold 1 and smaller than the threshold 2, and is classified as having a large size if the size of the object area is equal to or larger than the threshold 2, and the classification result is output as a representative feature.

The object classifying section 206 is explained.

The object classifying section 206 performs object classification on the basis of representative features computed by the feature classifying section 205. In an object classification method, for example, an object classification table having recorded thereon combinations of one or more representative features and object classes is stored on the memory 112 in advance, and obtained features are collated with the object classification table to thereby assess the object class.

FIG. 9 is an example of object classification table in the ES-cell differentiation assessment mentioned earlier.

Assessment results related to membrane and cytoplasm are output from the feature classifying section 205 as representative features. The table in FIG. 9 represents that a cell is assessed as an undifferentiated cell if the membrane of the cell is thin, and its cytoplasm amount is small, and a cell is assessed as a differentiated cell if the membrane of the cell is thick, and its cytoplasm amount is large. At this time, for example, in a case where there is an object found that does not match any of the combinations of representative features in the object classification table, like a cell with a thin membrane and a large cytoplasm amount, the object is assessed and output as an unknown object.

FIG. 17 is an example of object classification table in the material quality assessment mentioned earlier.

Assessment results related to element-area size and shape are output from the feature classifying section 205 as representative features. According to the table in FIG. 17, the material is assessed as being of high quality in a case where the size is large, and the shape is a circle, and the material is assessed as being of low quality in a case where the size is small, and the shape is a rectangle.

In addition, in order to tolerate a small amount of feature misassessment, for example, a tolerance range may be set for the numbers of matching features. For example, in a case where the tolerance range is set to 1, even if one representative feature in representative features in an object classification table does not match, the relevant object class is output as a result provided that remaining representative features match. In this case, a combination can match a plurality of objects, in some cases.

For example, in the example depicted in FIG. 9, if a cell has a combination of representative features of a thin membrane and a large cytoplasm amount, the combination has one matching representative feature and one unmatching representative feature regarding both the assessment results of an undifferentiated cell and a differentiated cell.

In such a case, for example, a decision may be made on the basis of the numbers of matches of representative features in a case where there is a difference in the numbers of matches, a decision may be made by giving weights to the representative features on the basis of levels of the importance of the features, or a decision may be made by performing weighted-addition or the like of the plausibility of each feature in a case where the feature classifying section 205 has output levels of the plausibility or the like of the features. Alternatively, all object classes in the tolerance range may be presented as candidates to a user.

As explained above, the object classifying section 206 outputs results of object class classification, and extraction results of representative features used for the classification. In addition, in a case where a tolerance range for unmatching features mentioned above is set, a flag representing whether or not each representative feature is a feature matching a condition of an assessment-result object class may be output as additional information.

In addition, in a case where, after checking classification results and classification grounds displayed via the output section 207, a user wants to add a new object class or edit an existing object class condition, the object classification table in the memory can be edited. Rewriting of the object classification table may be overwriting of it on the memory 112 after editing the object classification table by using an external apparatus such as a PC, or the object classification table in the memory 112 may be directly edited by using an input apparatus such as a keyboard which is not particularly depicted in FIG. 1.

In addition, the object classifying section 206 may group unknown objects according to combinations of representative features. For example, in a case where an object is classified as an unknown object as a result of collation with the object classification table, its combination of representative features is added to the object classification table as an unknown object A.

Thus, in a case where an unknown object having the same features is found next, the unknown object is assessed as the unknown object A. On the other hand, in a case where an object having features that match neither known objects nor the unknown object A is found, again, its combination of features is added as an unknown object B to the object classification table. By repeating this, unknown objects can be grouped.

Figure 10:
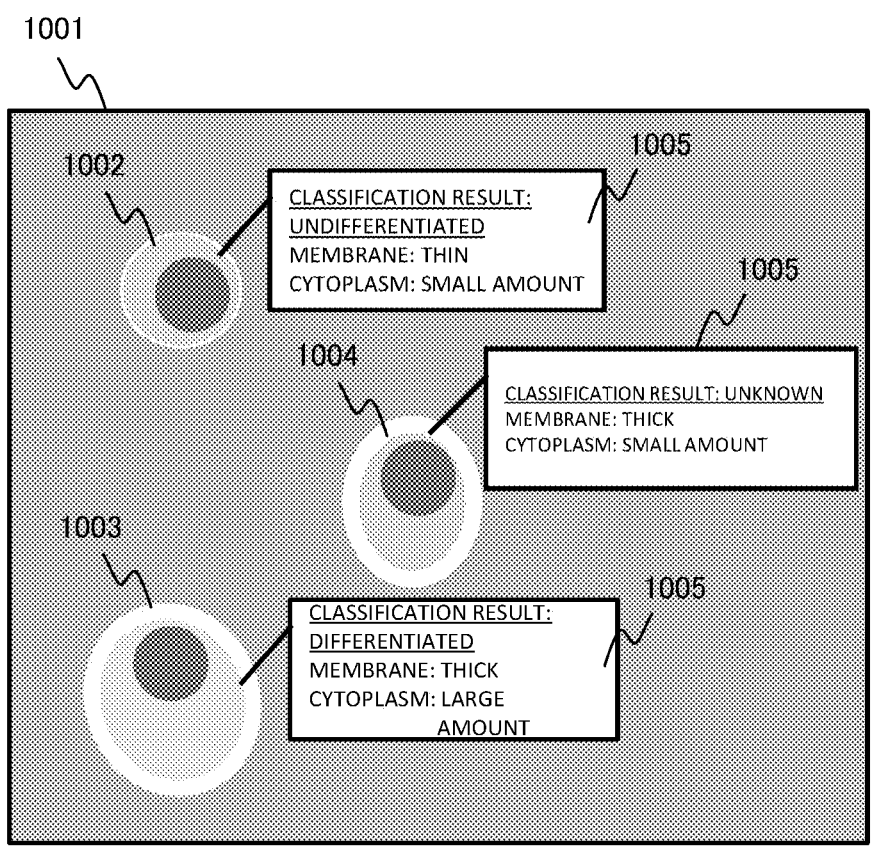
FIG. 10 is a figure depicting an example of display of object classification results according to the first embodiment.

The output section 207 is explained. The output section 207 adds, to an input image, results of object classification and information about representative features that serve as grounds for the classification, and displays them. FIG. 10 depicts an example of the ES-cell differentiation assessment mentioned before as an example of display. A microscopic image 1001 is an example image of ES cells captured by a microscope. It is supposed that a cell 1002 is an undifferentiated cell, and a cell 1003 and a cell 1004 are differentiated cells.

About each cell, an object classification result and representative features that serve as grounds for the classification result are displayed in a balloon 1005. For example, it can be known that it has been determined that the cell 1002 has a thin membrane, and its cytoplasm amount is small, and the cell 1002 has been classified as an undifferentiated cell. In addition, the cell 1004 is a differentiated cell, but the cell 1004 is misclassified as unknown since its representative features do not match a condition of differentiated cells. By checking the features in the balloon 1005, a user can easily understand that the reason why the features of the cell 1004 does not match the condition of differentiated cells is that it has been determined that the cytoplasm amount is small.

In addition, in view of the assessment results about the cell 1004, the user edits the content of the object classification table by adding "medium" to the assessment result about cytoplasm such that a cell is assessed as a differentiated cell in a case where its membrane is thick, and its cytoplasm amount is medium. In this manner, classification rules for combinations of unknown features can be added relatively easily.

In a case of conventional machine learning, this is coped with by performing retraining by adding an image, which is similar to the cell 1004, to training data. However, since it cannot be known why a classifier has misclassified the cell 1004, and types of features of an image that should be added, it takes a long time to enhance the classification precision of the classifier, in some cases. In addition, since all features are retrained, membrane-related features that do not cause any problems may be changed undesirably. According to the technique of the present invention, features that need to be retrained can be known clearly. Accordingly, it is easy to collect training data effective for retraining, and the retraining is possible without influencing other feature extractors.

An example of display in the material quality assessment mentioned before is depicted in FIG. 18. A microscopic image 1801 is an example image of the surface of the material captured by a microscope. It is supposed that an element 1802 configuring the texture of the material surface is an element that is seen in a case where the material is of high quality, an element 1803 is element that is seen both in a case where the material is of high quality and in a case where the material is of low quality, and an element 1804 is an element that is seen in a case where the material is of low quality. About each element, a quality assessment result and representative features that serve as grounds for the assessment result are displayed in a balloon 1805.

Figure 18:
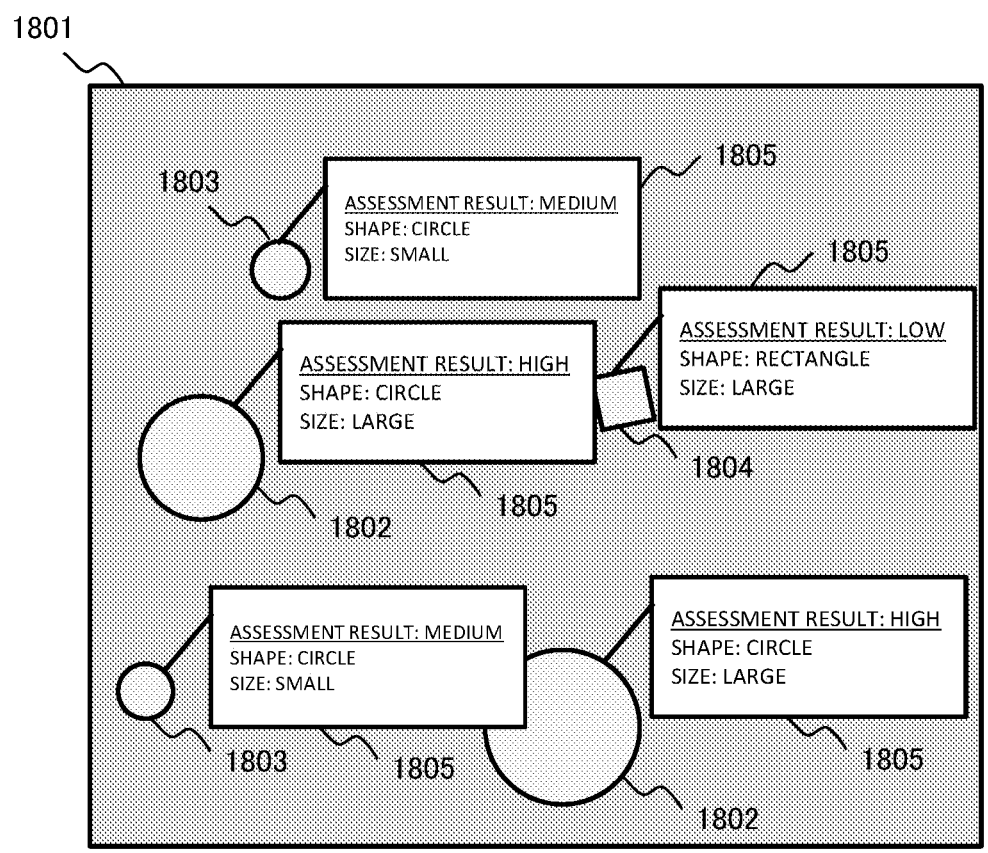
FIG. 18 is a figure depicting an example of display of object classification results according to the first embodiment.

It should be noted that, in FIG. 18, only whether or not each element is an element that is seen when the material is of high quality is displayed, and a quality evaluation result of the material as a whole is not presented. Quality evaluation of the material as a whole is explained in a third embodiment.

In addition, in a case where reference match information has been added to representative features, the representative features may be displayed such that it can be known whether they match or do not match references by changing the colors of text depending on whether they match or do not match the references. Thus, it is possible to easily identify features that did not satisfy a condition.

In addition, whereas assessment results and feature extraction results are displayed as text in the examples described above, each of them may be allocated with and displayed as a color, texture, symbol, or the like, the color, texture, symbol, or the like may be displayed in combination with text. In addition, in order to enhance visibility, information about classification and features of an object may be displayed only when a mouse pointer is placed over the object. In addition, the output method may use not only images, but object area information may be represented by coordinates of a start point and an end point, for example, and thereby the object area information may be output as text or binary data.

Figure 15:
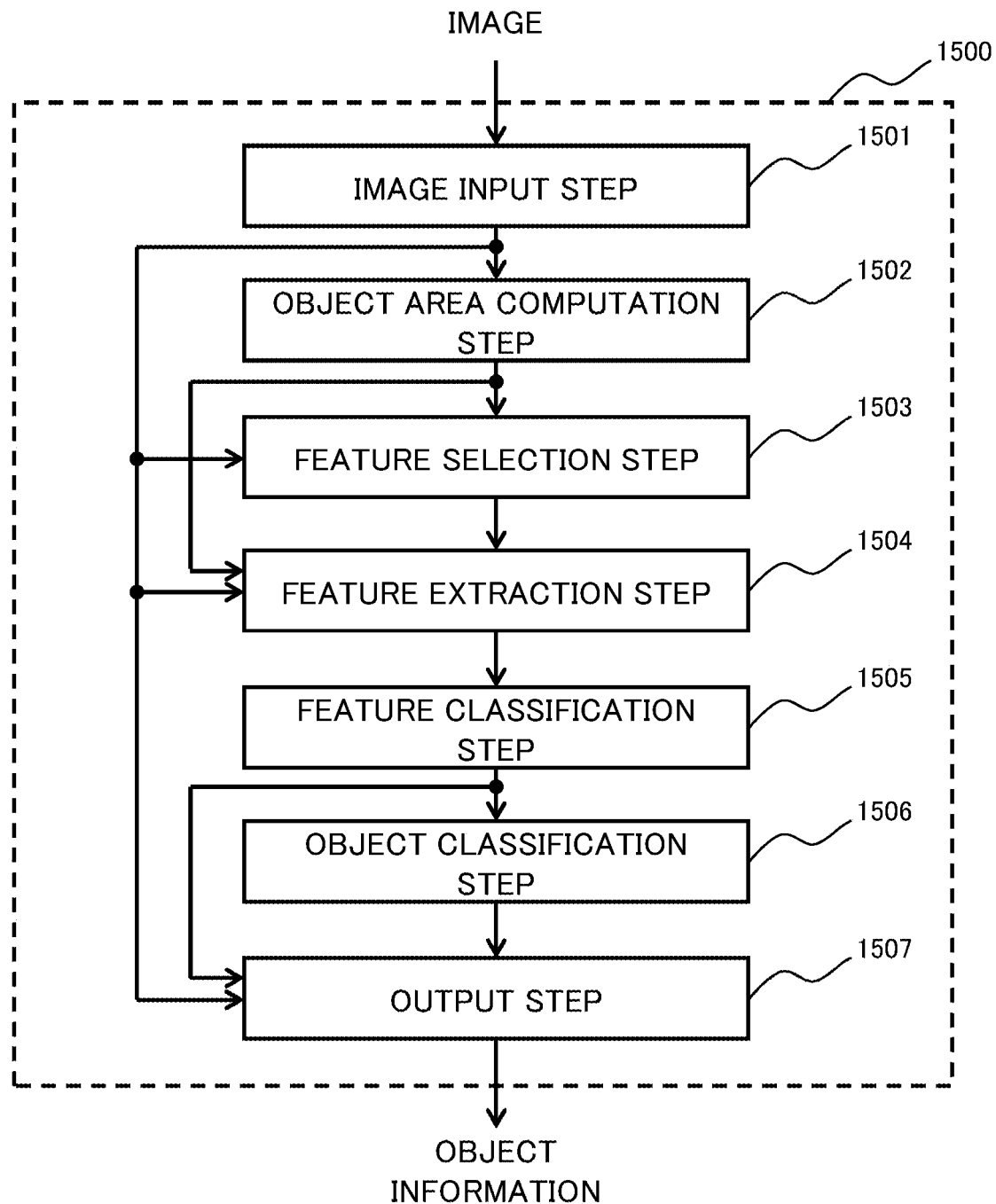
FIG. 15 is a figure depicting an example of process flow diagram according to the first embodiment.

In the description above, each functional block has been explained regarding details of the first embodiment. However, embodiments of the present invention do not necessarily have to include the functional blocks in FIG. 2, and it is sufficient if processes to realize operation of each functional block can be realized. FIG. 15 depicts an example of process flow diagram according to the first embodiment. Each step corresponds to an element in the functional block diagram depicted in FIG. 2.

At an image input step 1501, a captured image of an object is accepted.

At an object area computation step 1502, object areas which are to be treated as classification subjects are extracted by using the input image accepted at the image input step 1501. The explanation about the object area computing section 202 mentioned before is also relevant to the object area extraction method.

At a feature selection step 1503, feature selection signals are generated on the basis of the object area information computed at the object area computation step 1502, and the input image accepted at the image input step 1501. The explanation about the feature selecting section 203 mentioned before is also relevant to the feature selection signal generation method.

At a feature extraction step 1504, features for object classification are extracted from selected areas in the input image or the object area information by using selected features, on the basis of the feature selection signals generated at the feature selection step 1503. The explanation about the feature extracting section 204 mentioned before is also relevant to the feature extraction method.

At a feature classification step 1505, representative features of each object are computed on the basis of the object area information computed at the object area computation step 1502, the feature selection signals computed at feature selection step 1503, and the feature extraction results computed at the feature extraction step 1504. The explanation about the feature classifying section 205 mentioned before is also relevant to the representative feature computation method.

At an object classification step 1506, object classification is performed on the basis of the representative features computed at the feature classification step 1505. The explanation about the object classifying section 206 mentioned before is also relevant to the object classification method.

At an output step 1507, the object classification results computed at the object classification step 1506, and the representative features computed at the feature classification step 1505 are presented to a user in association with the input image. The explanation about the output section 207 mentioned before is also relevant to the method of the presentation to the user.

By automatically selecting features according to the sizes of objects in this manner, more robust feature extraction and assessment become possible. In addition, by outputting object classification results and representative features in association with an input image, it becomes possible for a user to check not only the object classification results, but also representative-feature extraction results.

Second Embodiment

A second embodiment relates to an object classification system that emphasizes or displays particular objects by using object classification results or feature information output by the object classifying apparatus described in the first embodiment.

Figure 11:
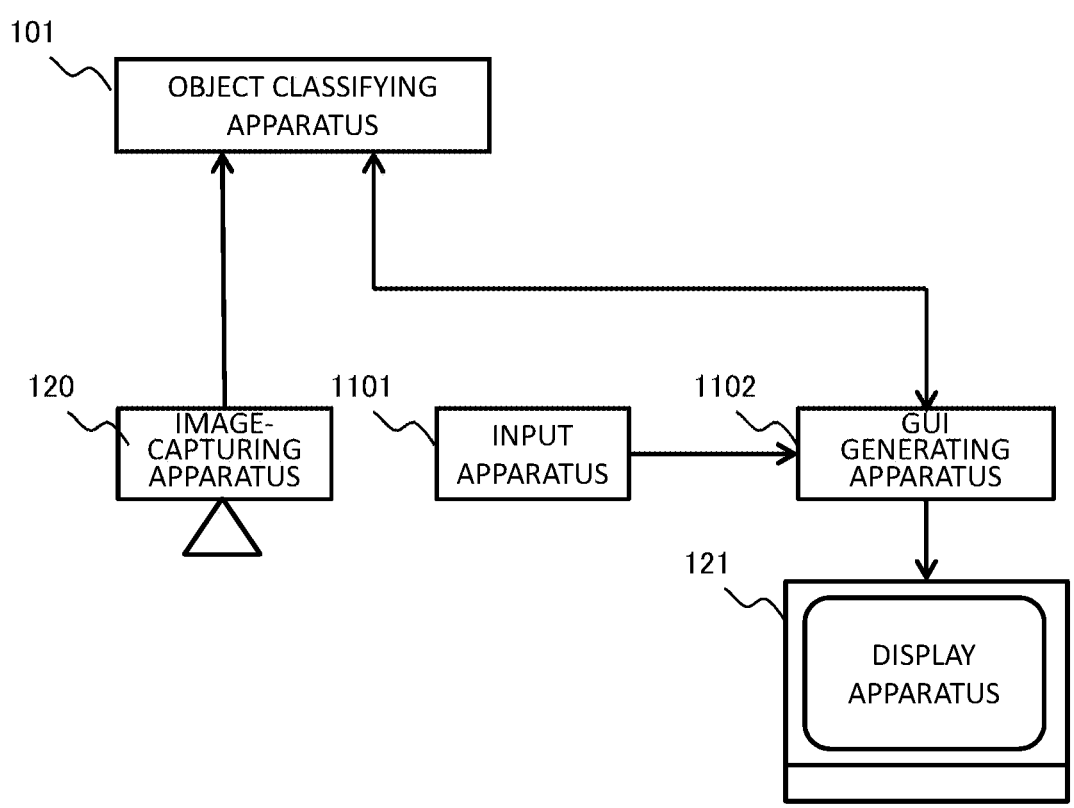
FIG. 11 is a figure depicting an example of hardware configuration of an object search system according to a second embodiment.

A hardware configuration diagram according to the second embodiment is depicted in FIG. 11. The only difference between the hardware configuration according to the second embodiment and the hardware configuration according to the first embodiment is that an input apparatus 1101 and a GUI generating apparatus 1102 are added to the former. Accordingly, only the input apparatus 1101 and the GUI generating apparatus 1102 are explained below. Since the object classifying apparatus 101, the image-capturing apparatus 120, and the display apparatus 121 are similar to their corresponding hardware constituent elements according to the first embodiment, explanations thereof are omitted.

The input apparatus 1101 is an apparatus that accepts user operation, and is, for example, a keyboard or a mouse. User operation information accepted by the input apparatus 1101 is input to the GUI generating apparatus 1102 mentioned later.

The GUI generating apparatus 1102 generates a GUI that emphasizes or displays only objects whose classification results or features match classification results or features of objects specified by a user, and displays the GUI on the display apparatus 121.

An example of GUI generated by the GUI generating apparatus 1102 is depicted in FIG. 12A. A GUI window 1201 includes a display section 1202 and a selecting section 1203. The display section 1202 displays an input image with no changes being made thereto, by default. The selecting section 1203 lists, as choices, classification results and feature extraction results included in output of the object classifying apparatus 101.

A checkbox is provided before each choice. The GUI generating apparatus 1102 creates an object search condition on the basis of the state of the group of checkboxes in the selecting section 1203, and extracts objects matching the search condition. Then, the areas of the matching objects in the display section 1202 are displayed in an emphasized format. As a method of creating an object search condition on the basis of the state of the group of checkboxes, for example, there is a method in which, first, checked items of each category are OR-combined, and the OR-combination results are AND-combined to obtain a search condition.

For example, in the state of checkboxes in FIG. 12A, the search condition is "(feature=thick) AND (assessment result=unknown)." If the checkbox "THIN" in the checkboxes about "CELL MEMBRANE" is further checked in the state of checkboxes in FIG. 12A, the search condition is "(feature=thick OR thin) AND (assessment result=unknown)."

In the example depicted in FIG. 12A, the area of an object matching the condition in the display section 1202 is displayed in an emphasized format with a dotted line. The display method depicted in FIG. 12A is an example. Matching objects may be displayed in an emphasized format by using colors, balloons, or the like, the areas of objects matching a condition may be cut out and displayed as a list on the display section 1202.

Figure 12B:
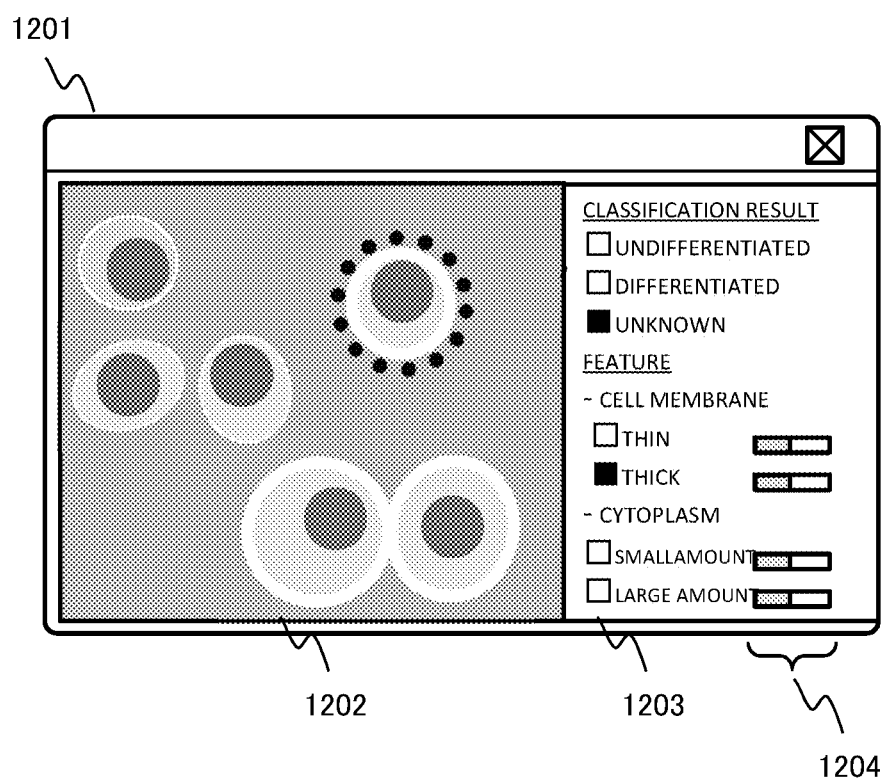
FIG. 12B is a figure depicting an example of GUI according to the second embodiment.

In addition, FIG. 12B depicts another example of GUI generated by the GUI generating apparatus 1102. The configuration content is almost the same as that in the FIG. 12A, but a sensitivity adjustment bar 1204 is provided at the end of each feature in the selecting section 1203. The sensitivity adjustment bar 1204 is a user interface for adjusting the extraction sensitivity of each feature. According to a value set by the adjustment of the sensitivity adjustment bar 1204, for example, the extraction sensitivity is adjusted at the feature extracting section 204 in the object classifying apparatus 101 by biasing output of a relevant feature filter. Hence, it becomes possible to observe at which levels of plausibility features of each object are computed.

In addition, although not particularly depicted in FIG. 12A or FIG. 12B, information such as the number of objects matching a condition or the ratio of the number of the objects to the number of all objects may be displayed on a GUI. In addition, a plurality of selecting sections 1203 may be provided to make it possible to simultaneously set a plurality of conditions. In this case, it may be made possible to visually distinguish the results from each other by using different colors for different conditions.

The GUIs depicted in FIG. 12A and FIG. 12B are examples, the layout or display method of elements are not limited to these, and it is sufficient if GUIs allow realization of similar user operation and display.

Thus, it becomes possible for a user to easily find objects having particular features in an image.

Third Embodiment

A third embodiment relates to an object classification system that computes the number, ratio, or the like of objects whose classification results are particular classification results or which have particular features, by using object classification results or feature information which are/is output by the object classifying apparatus described in the first embodiment, and are/is about a plurality of input images.

Figure 13:
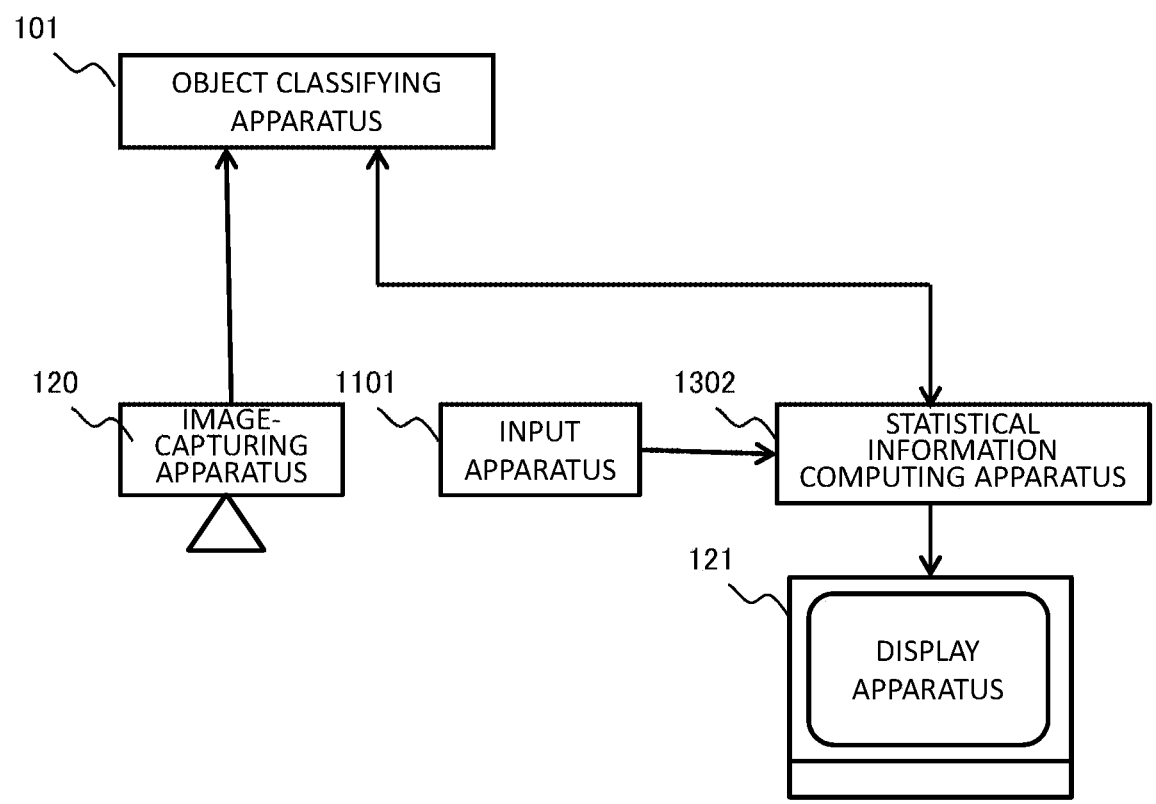
FIG. 13 is a figure depicting an example of hardware configuration of an object statistical information computing system according to a third embodiment.

A hardware configuration diagram according to the third embodiment is depicted in FIG. 13. The only difference between the hardware configuration according to the third embodiment and the hardware configuration according to the second embodiment is that a statistical information computing apparatus 1302 is added to the former. Accordingly, only the statistical information computing apparatus 1302 is explained below. Since the object classifying apparatus 101, the image-capturing apparatus 120, the display apparatus 121, and the input apparatus 1101 are similar to their corresponding hardware constituent elements according to the second embodiment, explanations thereof are omitted.

The statistical information computing apparatus 1302 accumulates and stores thereon object classification and feature extraction results output by the object classifying apparatus 101, computes statistical information on the basis of user selection accepted via the input apparatus 1101, and displays the statistical information on the display apparatus 121. It is supposed in the present implementation example that one or more input images are input to the object classifying apparatus 101 from the image-capturing apparatus 120.

The statistical information computing apparatus 1302 stores, on a memory in the statistical information computing apparatus 1302, results output by the object classifying apparatus 101 about input images every time the object classifying apparatus 101 outputs a result. Statistical information is computed by using the whole of a plurality of object classification results and feature extraction results stored on the memory.

Figure 19:
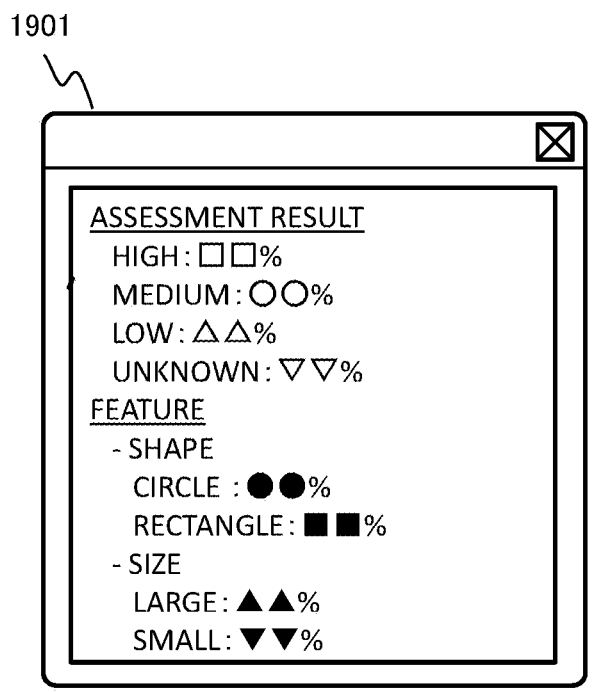
FIG. 19 is a figure depicting an example of statistical information display result according to the third embodiment.

FIG. 19 depicts an example of statistical information display result. A statistical information display window 1901 is a window for presenting, to a user, statistical information generated by the statistical information computing apparatus 1302, and is displayed on the display apparatus 121. The statistical information display window 1901 displays assessment results and statistical information about features computed from a plurality of objects in one or more images.

Note that FIG. 19 depicts an example of statistical information display in the material quality assessment mentioned before. In addition, although not particularly depicted in FIG. 19, a decision may be made about comprehensive assessment on the basis of assessment results or statistical information about features, and the decision may be displayed on the statistical information display window 1901. For example, explaining in terms of the example of material quality assessment, regarding quality assessment results of elements configuring the texture of the material surface, a threshold for assessment as "high" ratios, and a threshold for assessment as "medium" ratios may be set in advance. In a case where the ratio of "high" and "medium" in statistical information about quality assessment results of elements exceeds a threshold, the overall quality of the material may be assessed as "high," and displayed on the statistical information display window 1901.

Figure 14:
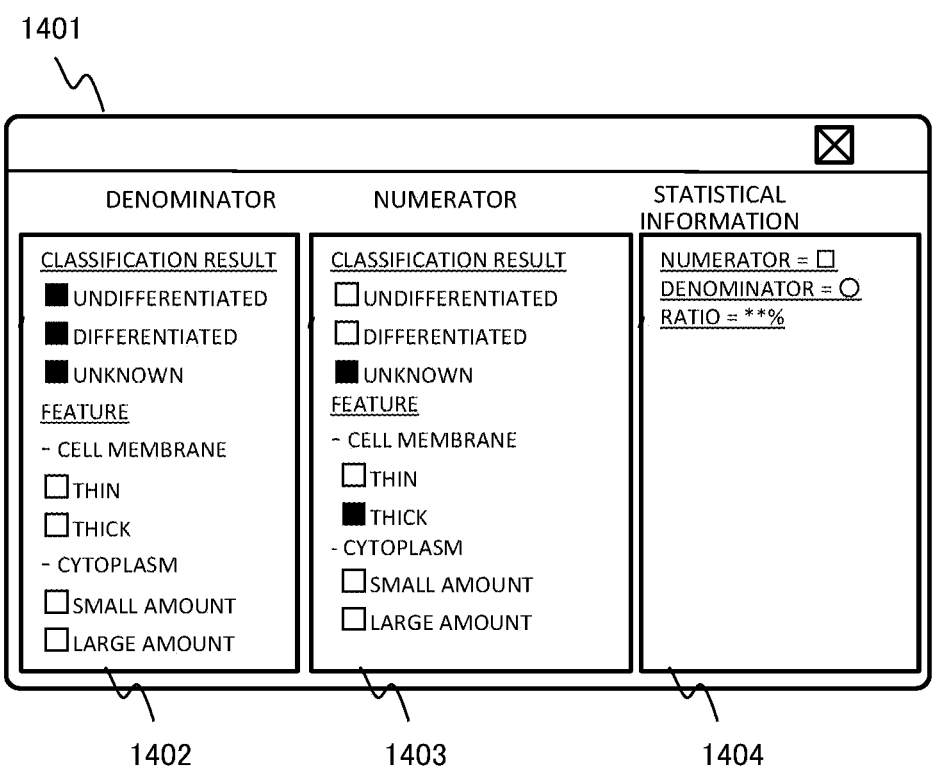
FIG. 14 is a figure depicting an example of GUI according to the third embodiment.

In addition, statistical information to be computed may be decided on the basis of user selection. User selection and results are displayed via a GUI generated by the statistical information computing apparatus 1302. FIG. 14 depicts an example of GUI for computing statistical information on the basis of user selection. A GUI window 1401 includes three sections, a denominator condition setting section 1402, a numerator condition setting section 1403, and a statistical information display section 1404. The denominator condition setting section 1402 and the numerator condition setting section 1403 display similar display content, and list object classification results and features.

In addition, a checkbox is provided before each item. The statistical information computing apparatus 1302 counts the number of objects whose classification results and features correspond to checked checkboxes. The number of objects matching a condition specified in the denominator condition setting section 1402 or the numerator condition setting section 1403 is displayed in the field of the denominator or numerator in the statistical information display section 1404. In addition, a result of division of the value of the numerator by the value of the denominator is displayed in the item of ratio. Thus, it becomes possible to compute the ratio of objects whose classification results or features are particular classification results or features in a plurality of input images.

According to the third embodiment, the number or ratio of objects whose classification results or features are particular classification results or features can be computed about objects in one or more input images. Thus, it becomes possible to assist more detailed evaluation or tendency observation of classification subject objects, examination of features effective for classification, and the like.

Modification Examples

Whereas the area segmentation technique is used as an example of object sensing method in the explanation about the object area computing section 202, a technique such as YOLO or SSD in which rectangles that surround individual objects are estimated may be used to compute object area information, or the techniques mentioned above may be combined to estimate rectangles that surround objects, and then apply area segmentation. In addition, instead of estimation of a distance image, a distance image may be computed from results of binary classification into foreground and background.

Whereas the scales of features to be selected are decided on the basis of the sizes of object areas in the explanation about the feature selecting section 203, an input image may be expanded or shrunk on the basis of the sizes of object areas. In addition, object areas may be rotated or deformed on the basis of the shapes of the object areas.

Whereas a method of setting a tolerance range for the number of matching features at a time of object classification is explained regarding the object classifying section 206, a tolerance range may be set for the number of unmatching features, or a tolerance range may be set for a rate of matching or unmatching features calculated by using, as the denominator, the number of features included in a condition.

Whereas, as an example of a method of adjusting sensitivity, a method of adding bias values to output of a feature filter is explained regarding the GUI generating apparatus 1102 according to the second embodiment, not only addition, but multiplication or exponential calculation, or the like may be used, or a combination of these may be used.

In the embodiments described above, area information about each object in an image is computed, the types, sizes, or application areas of features to be extracted are selected automatically on the basis of the area information about the objects, and features necessary for object classification are extracted on the basis of results of the feature selection. Then, the extracted features are classified, representative features (hereinafter, called representative features) for deciding the states of the objects are computed, and object classification is performed on the basis of a combination of the representative features. Thus, feature extraction according to sites in objects becomes possible, and it becomes possible to classify objects in an image more precisely.

In addition, by outputting results of object classification and representative features in association with an input image, it becomes possible to present the results of the object classification and the representative features which served as grounds for the classification to a user.

According to the embodiments described above, feature extraction according to sites in objects becomes possible, and it becomes possible to classify objects in an image more precisely. In addition, it becomes possible to present results of classification and features which served as grounds for the classification to a user.

DESCRIPTION OF REFERENCE CHARACTERS

100: Object classification system
101: Object classifying apparatus
110: Interface section
111: Calculating section
112: Memory
113: Bus
120: Image-capturing apparatus
121: Display apparatus
201: Image input section
202: Object area computing section
203: Feature selecting section
204: Feature extracting section
205: Feature classifying section
206: Object classifying section
207: Output section
301: Petri dish
1101: Input apparatus
1102: GUI generating apparatus
1201: GUI window
1202: Display section
1203: Selecting section
1204: Sensitivity adjustment bar
1302: Statistical information computing apparatus
1401: GUI window
1402: Denominator condition setting section
1403: Numerator condition setting section
1404: Statistical information display section
1901: Statistical information display window

The invention claimed is:

1. An object classifying apparatus that classifies objects in images, and identifies a type or a state of the object, the object classifying apparatus comprising:
 a deep learning machine;
 an object area computing section that computes an object area of the object in the image;
 a feature selecting section that selects a feature of the object by using the object area, and outputs a feature selection signal;
 a feature extracting section that extracts a plurality of the features from within the image on a basis of the feature selection signal;
 a feature classifying section that classifies a plurality of the features, and extracts representative features which are representative features for deciding the type or the state of the object;
 an object classifying section that identifies the type or the state of the object and classifies the object on a basis of the representative features, and outputs a classification result of the object; and
 an output section that outputs the classification result and the representative features of the object in association with the image,
 wherein
 the object area computing section separates mutually-contacting objects by estimating a distance image, and
 the object classifying section classifies the object by referring to an object classification table having stored thereon the representative features and the type or the state of the object in association with each other.

2. The object classifying apparatus according to claim 1, wherein
 the feature selecting section
 selects some features in a plurality of the features by using the object area, and outputs a feature selection signal including types and sizes of the features, and area information about an area from which the features are to be extracted,
 the feature extracting section
 extracts the features according to a site of the object,
 the object classifying section
 classifies the object on a basis of a combination of the representative features, and
 the output section
 outputs, for each of the representative features, the classification result and the representative feature of the object in association with each other.

3. The object classifying apparatus according to claim 1, wherein
 the feature classifying section
 extracts the representative features of the object on a basis of the object area computed by the object area computing section, the feature selection signal computed by the feature selecting section, and the feature extracted by the feature extracting section.

4. The object classifying apparatus according to claim 1, wherein
 the feature selecting section
 selects a type of the feature to be applied to the image on a basis of a size of the object area.

5. An object classification system comprising:
the object classifying apparatus according to claim 1;
an image-capturing apparatus that captures the image to be input to the object classifying apparatus; and
a display apparatus that displays, in association with each other and in the image, the classification result and the representative features of the object.

6. An object classification system comprising:
the object classifying apparatus according to claim 1;
an image-capturing apparatus that captures the image to be input to the object classifying apparatus;
an input apparatus that accepts user operation information;
a GUI (graphic user interface) generating apparatus that generates a GUI for displaying, in an emphasized format, a predetermined object selected by the user on the input apparatus, on a basis of at least one of the classification result or the representative features of the object; and
a display apparatus that displays the GUI generated by the GUI generating apparatus.

7. The object classification system according to claim 6, wherein
the GUI (graphic user interface) generating apparatus
generates the GUI having sensitivity adjustment bars that can adjust extraction sensitivities of the representative features.

8. An object classification system comprising:
the object classifying apparatus according to claim 1;
an image-capturing apparatus that captures the image to be input to the object classifying apparatus;
a statistical information computing apparatus that computes statistical information including a number or distribution of objects on a basis of the representative features and the classification results of the objects output from the object classifying apparatus; and
a display apparatus that displays the statistical information output by the statistical information computing apparatus.

9. An object classification method of classifying an object in an image, and identifies a type or a state of the object, the object classification method comprising:
a deep learning machine;
an object area computation step of computing an object area of the object in the image;
a feature selection step of selecting a feature of the object by using the object area, and outputting a feature selection signal;
a feature extraction step of extracting a plurality of the features from within the image on a basis of the feature selection signal;
a feature classification step of classifying a plurality of the features, and extracting representative features which are representative features for deciding the type or the state of the object;
an object classification step of identifying the type or the state of the object and classifying the object on a basis of the representative features, and outputting a classification result of the object; and
an output step of outputting the classification result and the representative features of the object in association with the image,
wherein
the object area computing section separates mutually-contacting objects by estimating a distance image, and
the object classifying section classifies the object by referring to an object classification table having stored thereon the representative features and the type or the state of the object in association with each other.

10. The object classification method according to claim 9, wherein
the feature selection step
includes selecting some features in a plurality of the features by using the object area, and outputting a feature selection signal including types and sizes of the features, and area information about an area from which the features are to be extracted,
the feature extraction step
includes extracting the features according to a site of the object,
the object classification step
includes classifying the object on a basis of a combination of the representative features, and
the output step
includes outputting, for each of the representative features in a combination of the representative features, the classification result and the representative feature of the object in association with each other.

11. The object classification method according to claim 9, wherein
the feature classification step
includes extracting the representative features of the object on a basis of the object area computed at the object area computation step, the feature selection signal computed at the feature selection step, and the feature extracted at the feature extraction step.

12. The object classification method according to claim 9, wherein
the feature selection step
includes selecting a type of the feature to be applied to the image, on a basis of a size of the object area.

13. The object classification method according to claim 9, wherein
the object area computation step
includes separating mutually-contacting objects by estimating a distance image.

* * * * *